United States Patent
Bockenstette et al.

(10) Patent No.: US 9,028,359 B2
(45) Date of Patent: *May 12, 2015

(54) MULTI-SPEED TRANSMISSION WITH AN ENGINE START/STOP ENABLER

(71) Applicant: GM Global Technology Operations LLC, Detroit, MI (US)

(72) Inventors: Casie M. Bockenstette, Clarkston, MI (US); Carlos E. Marin, Oxford, MI (US); Paul G. Otanez, Troy, MI (US); Craig S. Ross, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/937,443

(22) Filed: Jul. 9, 2013

(65) Prior Publication Data

US 2015/0018163 A1    Jan. 15, 2015

(51) Int. Cl.
*F16H 3/66* (2006.01)
*F16H 3/62* (2006.01)

(52) U.S. Cl.
CPC .. *F16H 3/62* (2013.01); *F16H 3/66* (2013.01); *F16H 2200/0069* (2013.01); *F16H 2200/2012* (2013.01); *F16H 2200/2046* (2013.01)

(58) Field of Classification Search
USPC .......... 475/118–120, 275–291, 330; 477/115, 477/127
See application file for complete search history.

(56) References Cited

U.S. PATENT DOCUMENTS

| | | | |
|---|---|---|---|
| 4,729,462 A | 3/1988 | Braun | |
| 6,771,031 B1 | 8/2004 | Bai | |
| 7,699,741 B2 | 4/2010 | Hart et al. | |
| 8,556,765 B2* | 10/2013 | Bockenstette et al. | 475/275 |
| 8,574,113 B1* | 11/2013 | Goleski | 475/282 |
| 2005/0258013 A1 | 11/2005 | Stevenson et al. | |
| 2008/0207381 A1 | 8/2008 | Wittkopp et al. | |
| 2008/0314711 A1 | 12/2008 | Jayaram et al. | |
| 2009/0280941 A1 | 11/2009 | Dusenberry et al. | |
| 2010/0063693 A1 | 3/2010 | Lee et al. | |
| 2010/0248890 A1 | 9/2010 | Baldwin | |
| 2010/0279814 A1* | 11/2010 | Brehmer et al. | 475/275 |
| 2012/0138412 A1 | 6/2012 | Rogner | |
| 2012/0193188 A1 | 8/2012 | Neelakantan et al. | |
| 2013/0047759 A1 | 2/2013 | Bockenstette et al. | |
| 2014/0038764 A1* | 2/2014 | Goleski | 475/275 |

OTHER PUBLICATIONS

Farzad Samie and Chunhao Joseph Lee, Selectable One-Way Clutch in GM's RWD 6-Speed Automatic Transsmisions, SAE Int., Jan. 2009, vol. 2, Issue 1, Brice Pawley Means Industries, USA.
U.S. Appl. No. 61/636,963, filed Apr. 23, 2012, by Ross et al. All pages.
U.S. Appl. No. 61/640,944, filed May 1, 2012, by Ross et al. All pages.

(Continued)

*Primary Examiner* — Roger Pang (57) ABSTRACT

A transmission includes an input member, an output member, four planetary gear sets, and a plurality of torque transmitting mechanisms that are selectively engageable to establish at least ten forward speed ratios and at least one reverse speed ratio between the input member and the output member. The transmission further includes one or more locking mechanisms that engage one or more of the plurality of torque transmitting mechanisms during a start/stop event.

20 Claims, 3 Drawing Sheets

(56) References Cited

OTHER PUBLICATIONS

U.S. Appl. No. 13/921,903, filed Jun. 19, 2013, by Bockenstette et al. All pages.

U.S. Appl. No. 13/921,906, filed Jun. 19, 2013, by Bockenstette et al. All pages.

U.S. Appl. No. 13/921,912, filed Jun. 19, 2013, by Bockenstette et al. All pages.

* cited by examiner

| GEAR STATE | RATIO STEP | TORQUE TRANSMITTING ELEMENTS | | | | | |
|---|---|---|---|---|---|---|---|
| | | 32 | 34 | 24 | 30 | 26 | 28 |
| 1ST | 4.74 | X | X | X | | | |
| 2ND | 3.03 | X | X | | | X | |
| 3RD | 2.12 | X | | X | | X | |
| 4.1 | 1.73 | X | | | | X | X |
| 4.2 | 1.73 | X | | | X | | X |
| 4.3 | 1.73 | X | | | X | X | |
| 5TH | 1.50 | X | | X | | | X |
| 6TH | 1.24 | X | | X | X | | |
| 7.1 | 1.00 | | | X | | X | X |
| 7.2 | 1.00 | | | X | X | | X |
| 7.3 | 1.00 | | | X | X | X | |
| 8TH | 0.87 | | X | X | X | | |
| 9TH | 0.69 | | X | X | | | X |
| 10.1 | 0.64 | | X | | | X | X |
| 10.2 | 0.64 | | X | | X | | X |
| 10.3 | 0.64 | | X | | X | X | |
| REV | -6.05 | X | X | | X | | |

X = ON - ENGAGED CARRYING TORQUE

FIG. 4

MULTI-SPEED TRANSMISSION WITH AN ENGINE START/STOP ENABLER

FIELD

The present invention relates to a multi-speed transmission. More specifically, the present invention relates to a multi-speed transmission that includes an engine start/stop enabler.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios. Generally, the transmission includes a hydraulic control system that, among other functions, is employed to actuate a plurality of torque transmitting devices and to provide lubrication and cooling to the components of the transmission.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. For example, to increase the fuel economy of motor vehicles, it is desirable to stop the engine during certain circumstances, such as when stopped at a red light or idling. However, during this automatic stop, a pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle. Therefore, there is a need in the art for an automatic transmission enabled for engine stop-start events such that the automatic start/stop event does not affect transmission operating performance.

SUMMARY

A transmission for a motor vehicle includes an input member, an input member, an output member, first, second, third and fourth planetary gear sets each having first, second and third members, six torque transmitting mechanisms selectively engageable to interconnect one of the first, second, and third members with at least one other of the first members, second members, third members and a stationary member. The torque transmitting mechanisms are selectively engageable in combinations of at least three to establish at least ten forward speed ratios and at least one reverse speed ratio between the input member and the output member. The transmission further includes a first and a second latching mechanism. The first latching mechanism is connected to a fifth of the six torque transmitting mechanisms and latches the fifth torque transmitting mechanism in an engaged state when the motor vehicle is stopped. The second latching mechanism is connected to a sixth of the six torque transmitting mechanisms and latches the sixth torque transmitting mechanism in an engaged state when the motor vehicle is stopped. The fifth and sixth torque transmitting mechanisms are in the engaged state during a first forward gear.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These mechanical connections generically link or relate the transmission embodiments. More specifically, a first component or element of a first planetary gear set is permanently coupled to a first component or element of the second planetary gear set. A second component or element of the first planetary gear set is permanently coupled to a third component or element of a fourth planetary gear set. A third component or element of the second planetary gear set is permanently coupled to a third component or element of a third planetary gear set. A second component or element of the third planetary gear set is permanently coupled to a second component or element of the fourth planetary gear set.

Figure 1:
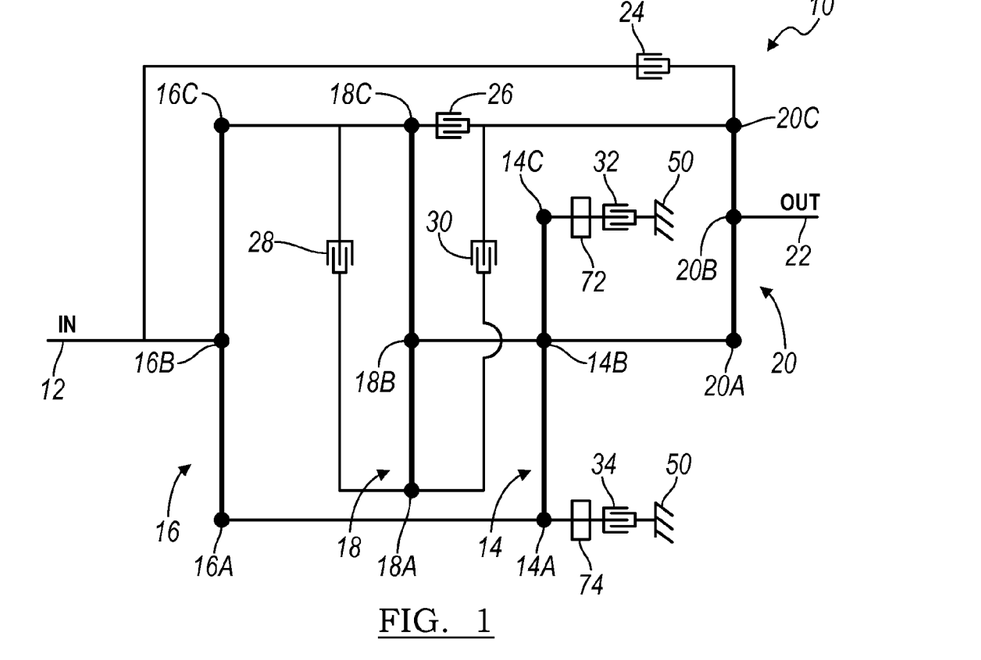
FIG. 1 is a lever diagram of an example of a multi-speed transmission in accordance with the present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting mechanisms such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the second node 16B of the second planetary gear set 16. The output member 22 is continuously coupled to the second node 20B of the fourth planetary gear set 20.

The first node 14A of the first planetary gear set 14 is coupled to the first node 16A of the second planetary gear set 16. The second node 14B of the first planetary gear set 14 is coupled to the second node 18B of the third planetary gear set 18 and to the first node 20A of the fourth planetary gear set 20. The third node 16C of the second planetary gear set 16 is coupled to the third node 18C of the third planetary gear set 18.

A first clutch 24 selectively connects the second node 16B of the second planetary gear set 16 with the third node 20C of the fourth planetary gear set 20. A second clutch 26 selectively connects the third node 16C of the third planetary gear set 16 and the third node 18C of the third planetary gear set 18 with the third node 20C of the fourth planetary gear set 20. A third clutch 28 selectively connects the third node 16C of the planetary gear set 16 and the third node 18C of the third planetary gear set 18 with the first node 18A of the third planetary gear set 18. A fourth clutch 30 selectively connects the first node 18A of the third planetary gear set 18 with the third node 20C of the fourth planetary gear set 20.

A first brake 32 selectively connects the third node 14C of the first planetary gear set 14 with the stationary member or transmission housing 50. A second brake 34 selectively connects the first node 14A of the first planetary gear set 14 and the first node 16A of the second planetary gear set 16 with the stationary member or transmission housing 50.

Figure 2:
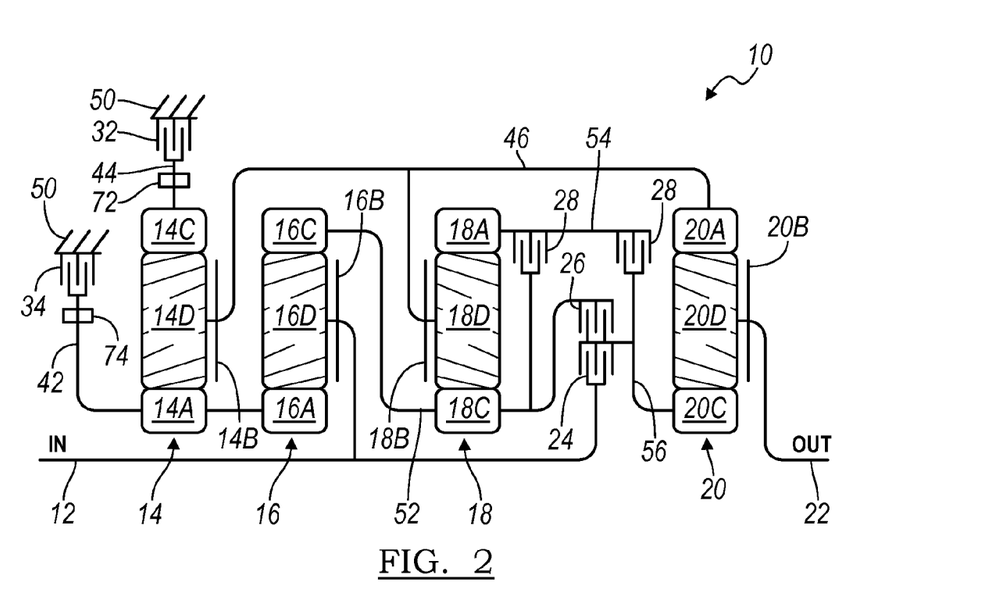
FIG. 2 is a schematic representation of an example of the transmission shown in FIG. 1 in accordance with the present invention.

Referring now to FIG. 2, a stick diagram presents a schematic layout of an embodiment of the multi-speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14C, and a planet gear carrier member 14B that rotatably supports a set of planet gears 14D. The sun gear member 14A is connected for common rotation with a first shaft or interconnecting member 42. The ring gear member 14C is connected for common rotation with a second shaft or interconnecting member 44. The planet carrier member 14B is connected for common rotation with a third shaft or interconnecting member 46. The set of planet gears 14D are each configured to intermesh with both the sun gear member 14A and the ring gear member 14C.

The second planetary gear set 16 includes a sun gear member 16A, a ring gear member 16C, and a planet gear carrier member 16B that rotatably supports a set of planetary gears 16D (only one of each is shown). The sun gear member 16A is connected for common rotation with the first shaft or interconnecting member 42. The ring gear member 16C is connected for common rotation with a fourth shaft or interconnecting member 48 and a fifth shaft or interconnecting member 52. The planet carrier member 16B is connected for common rotation with the input shaft or member 12. The planet gears 16D are each configured to intermesh with both the ring gear member 16C and the sun gear member 16A.

The third planetary gear set 18 includes a sun gear member 18C, a ring gear member 18A, and a planet gear carrier member 18B that rotatably supports a set of planet gears 18D (only one of which is shown). The sun gear member 18C is connected for common rotation with the fifth shaft or interconnecting member 52. The ring gear member 18A is connected for common rotation with a sixth shaft or interconnecting member 54. The planet carrier member 18B is connected for common rotation with the third shaft or interconnecting member 46. The planet gears 18D are each configured to intermesh with both the sun gear member 18C and the ring gear member 18A.

The fourth planetary gear set 20 includes a sun gear member 20C, a ring gear member 20A and a planet gear carrier member 20B that rotatably supports a set of planet gears 20D (only one of which is shown). The sun gear member 20C is connected for common rotation with the seventh shaft or interconnecting member 56. The ring gear member 20A is connected for common rotation with the third shaft or interconnecting member 46. The planetary gear carrier member 20B is connected for common rotation with the output shaft or member 22. The planet gears 20D are each configured to intermesh with both the sun gear member 20C and the ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque transmitting mechanisms, including the first, second, third and fourth clutches 24, 26, 28, 30 and the first and second brakes 32 and 34 allow for selective interconnection of the shafts or interconnecting members 42, 44, 46, 48, 52, 54, and 56 of the planetary gear sets 14, 16, 18, 20 and the housing 50.

For example, the first clutch 24 is selectively engageable to connect the input shaft or member 12 with the seventh shaft or interconnecting member 56. The second clutch 26 is selectively engageable to connect the fourth shaft or interconnecting member 48 with the seventh shaft or interconnecting member 56. The third clutch 28 is selectively engageable to connect the fourth shaft or interconnecting member 48 with the sixth shaft or interconnecting member 54. Accordingly, the third clutch 28 selectively interconnects the ring gear 16C of the second planetary gear set 16 and the sun gear 18C of the third planetary gear set 18 with the ring gear 18A of the third planetary gear set 18. The fourth clutch 30 is selectively engageable to connect the sixth shaft or interconnecting member 54 with the seventh shaft or interconnecting member 56.

The first brake 32 is selectively engageable to connect the second shaft or interconnecting member 44 with the stationary element or the transmission housing 50 in order to restrict the member 44 from rotating relative to the transmission housing 50. The second brake 34 is selectively engageable to connect the first shaft or interconnecting member 42 with the stationary element or the transmission housing 50 in order to restrict the member 42 from rotating relative to the transmission housing 50. In turn, the components of the planetary gear sets connected to each of the connecting members are also connected or restricted accordingly.

Figure 4:
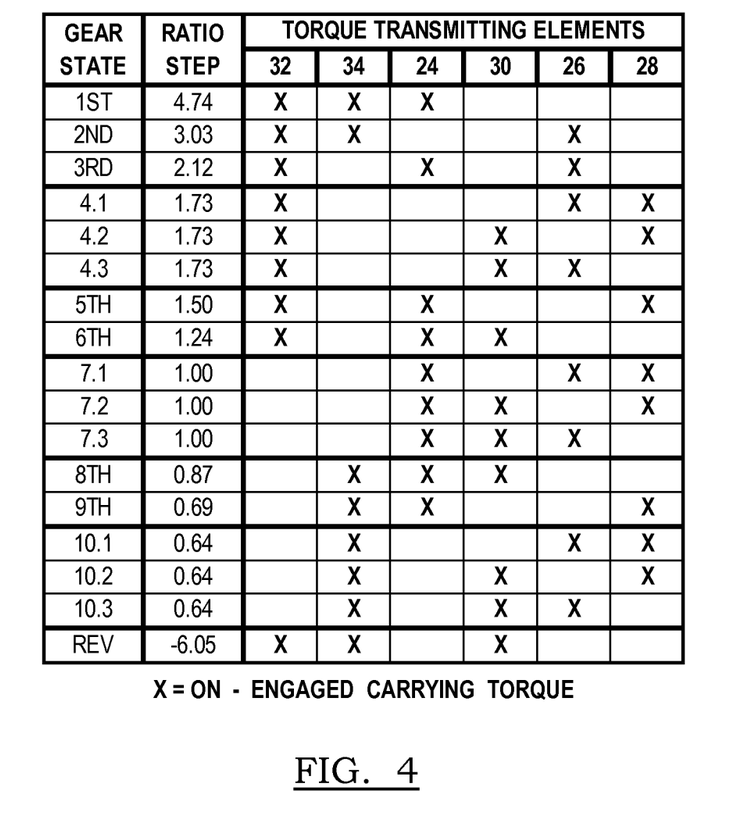
FIG. 4 is a truth table listing the engaged torque transmitting mechanisms for selected torque ratios achieved by the transmission of FIG. 2.

Referring now to FIGS. 1, 2 and FIG. 4, the operation of the multi-speed transmission 10 embodiment will be described. It will be appreciated that transmission 10 is capable of transmitting torque from the input shaft or member 12 to the output shaft or member 22 in multiple forward speed torque ratios and at least one reverse speed or torque ratio. Each forward and reverse speed or torque ratio is attained by engagement of one or more of the torque transmitting mechanisms (i.e. first clutch 24, second clutch 26, third clutch 28, fourth clutch 30, first brake 32 and second brake 34), as will be explained below.

FIG. 4 is a truth table presenting the various combinations of torque transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, to establish a reverse gear, the fourth clutch 30, the first brake 32 and the second brake 34 are engaged or activated. The fourth clutch 30 connects the sixth shaft or interconnecting member 54 with the seventh shaft or interconnecting member 56. The first brake 32 connects the second shaft or interconnecting member 44 with the stationary element or the transmission housing 50 in order to restrict the member 44 from rotating relative to the transmission housing 50, which restricts the ring gear 14C from rotating relative to the transmission housing 50. The second brake 34 connects the first shaft or interconnecting member 42 with the stationary element or the transmission housing 50 in order to restrict the member 42 from rotating relative to the transmission housing 50, which restricts the sun gears 14A and 16A from rotating relative to the transmission housing 50. Likewise, ten forward ratios are achieved through different combinations of clutch and brake engagement, as shown in FIG. 4, by way of example. Moreover, the present invention contemplates additional or alternative combinations of clutch and brake engagement to achieve the fourth, seventh and tenth gear ratios as shown in FIG. 4. Specifically, the combinations of clutch and brake engagements shown in FIG. 4 are not limited to the transmission illustrated in FIGS. 1 and 2.

It will be appreciated that the foregoing explanation of operation and gear states of the ten speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 3:
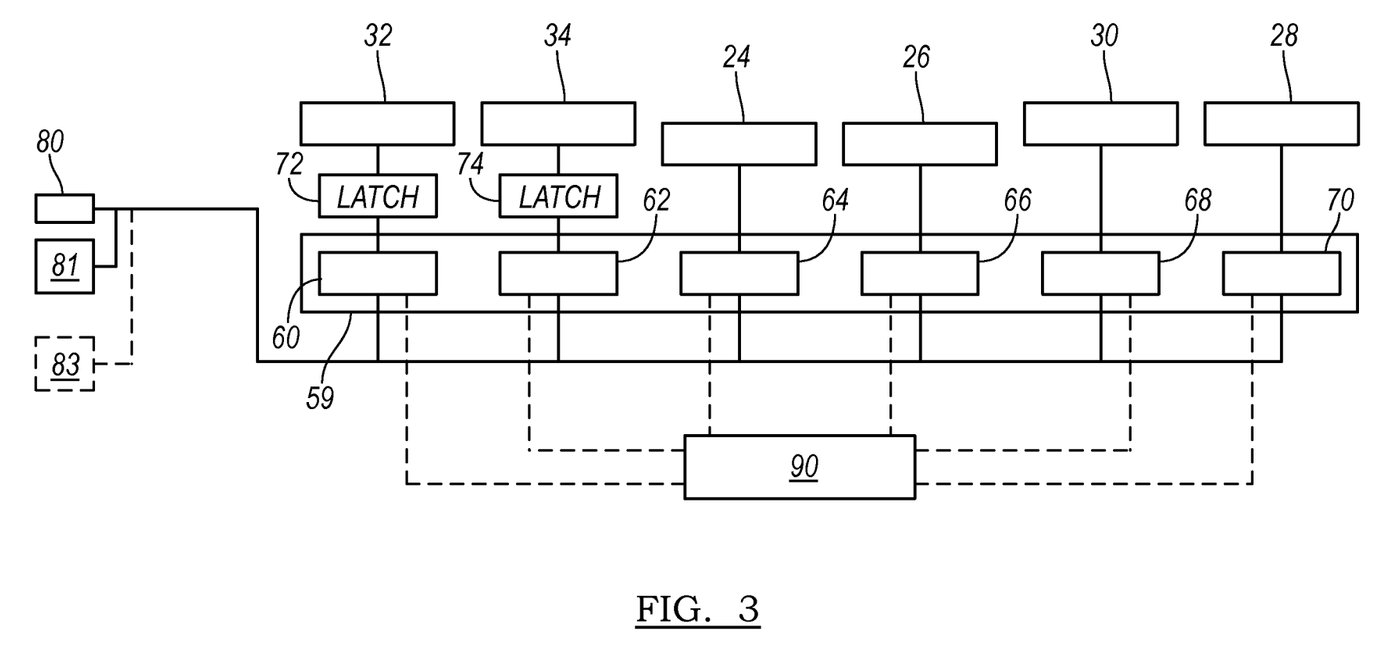
FIG. 3 is a block diagram of the transmission shown with an engine start/stop enabler.

With further reference to FIG. 3, the transmission 10 includes an engine start/stop enabler with a locking or latching mechanism 72 associated with the fifth clutch 32 and a locking or latching mechanism 74 associated with the second brake 34. Note that, alternatively, only one locking mechanism may be employed with the associated torque transmitting mechanism. The transmission also includes a hydraulic control system 59 with a first solenoid 64, a second solenoid 66, a third solenoid 60, a fourth solenoid 62, a fifth solenoid 70, and a sixth solenoid 68. In some arrangements, the solenoids 64, 66, 60, 62, 70, and 68 are variable force solenoids. In the particular arrangement shown in FIG. 3, the first clutch 24 is in communication with the first solenoid 64. The second clutch 26 is in communication with the second solenoid 66. The third clutch 28 is in communication with the fifth solenoid 70. The fourth clutch 30 is in communication with the sixth solenoid 68. The fifth clutch 32 is in communication with the third solenoid 60. And the sixth clutch 34 is in communication with the fourth variable force solenoid 62. The locking mechanisms 72 and 74 can be any suitable mechanism that lock the respective clutch or brake, such as, for example, those described below. The locking mechanisms 72 and 74 do not have to be fully locked. For example, the locking mechanisms 72 and 74 can hold the torque transmitting mechanisms 32 and 34 at a filled state, other staged state, fully engaged or anything in between.

Note further that the hydraulic control system 59 may employ various other systems, modules, etc. For example, in various arrangements, the hydraulic control system 59 includes, for example, variable bleed solenoids or on/off devices or any other suitable devices to selectively engage the torque transmitting mechanisms 24, 26, 28, 30, 32, and 34 by selectively communicating hydraulic fluid to the various torque transmitting mechanisms.

A pressure regulator subsystem that includes an engine driven pump 80 and an accumulator 81 provides pressurized hydraulic fluid to the solenoids 60, 62, 64, 66, 68, and 70. Alternatively the transmission 10 may include a second, auxiliary pump 83. The pressure regulator subsystem including the pump 80 and accumulator 81, as well as the solenoids 60, 62, 64, 66, 68, and 70, receive instructions from a controller 90. The controller 90 may be a transmission control module (TCM), an engine control module (ECM), or a hybrid control module, or any other type of controller, or any combination of controllers. The controller 90 is preferably an electronic control device having a preprogrammed digital computer or processor, control logic, memory used to store data, and at least one I/O peripheral. The control logic includes a plurality of logic routines for monitoring, manipulating, and generating data.

When the motor vehicle comes to a stop or experiences an auto stop event with the engine turned off, the motor vehicle typically starts again in first, second, or reverse gear. That is, the torque transmitting devices 30, 32, and 34 are engaged for reverse gear; the torque transmitting mechanisms 24, 32, and 34 are engaged for first gear; or torque transmitting mechanisms 26, 32, and 34 are engaged for second gear. Accordingly, when the motor vehicle is ready to start again and the locking mechanisms 72 and 74 are not employed, the transmission pump 80 is generally required to pump sufficient pressure to the torque transmitting mechanisms 24, 26, 30, 32, and 34 after a vehicle stop so that the torque transmitting mechanisms 32 and 34 and one of the torque transmitting mechanisms 24, 26, and 30, depending on which gear is desired, can be readily engaged when the vehicle starts again. Sufficient pressure is preferably provided so that the torque transmitting mechanisms can be quickly engaged without lag when the vehicle starts again. Alternatively, the accumulator 81 is sized to provide sufficient fluid volume and flow, as moderated by respective solenoids 60, 62, 64, 66, and 68 to the torque transmitting mechanisms 32 and 34 and one of the torque transmitting mechanisms 24, 26, and 30. Alternatively, the auxiliary pump 83 can be employed in place of the accumulator 81 to provide the appropriate hydraulic fluid pressure to the devices in the hydraulic control system 59 to selectively engage the torque transmitting mechanisms 24, 26, 30, 32, and 34. Moreover, if the vehicle experiences an auto stop event, such as when the engine is off, the main pump 80 no longer supplies pressure to the torque transmitting mechanisms 24, 26, 28, 30, 32, and 34. Accordingly, at an auto stop and when the transmission 10 only employs the main transmission pump 80 (that is, the accumulator 81, the auxiliary pump 83, and the locking mechanisms 72 and 74 are not employed) there is potential for lag in the transmission system if the torque transmitting mechanisms are not engaged quickly enough as the main pump 80 builds system pressure again. If locking mechanisms are employed on one or more torque transmitting mechanisms 24, 26, 30, 32, and 34, demands on the pump 80 are reduced and the potential for lag is reduced. The accumulator 81 can be employed to provide fluid flow to the torque transmitting devices at an auto start event while the main pump 80 is building system pressure. As such, the use of the locking mechanisms reduces demands of the accumulator 81. The auxiliary pump 83 can be employed to provide pressure to the system while the engine is shut off. Using the locking mechanisms in such a system reduces the demands on the auxiliary pump 83.

With the implementation of the locking mechanisms 72 and 74, which can be mechanical latches, hydraulic latches, electro-mechanical latches or any other suitable mechanism and which can be under the control of the controller 90, the torque transmitting mechanisms 32 and 34 can be considered holding brakes. That is, prior to or at a start event, the locking mechanisms 72 and 74 are activated to engage the torque transmitting mechanisms 32 and 34, respectively. As such, the transmission pump 80 or the accumulator 81 or auxiliary pump 83 only has to provide sufficient pressure or sufficient volume of hydraulic fluid to engage one of the torque transmitting mechanisms 24, 26, and 30 for first, reverse, or second gear. Hence, with the use of the locking mechanisms 72, and 74, the transmission pump 80, or the accumulator 81, or the auxiliary pump 83 is required to provide pressure or fluid volume for one toque transmitting device for a start event, whereas without the locking mechanisms 72 and 74, the transmission pump 80, or the accumulator 81, or the auxiliary pump 83 are required to provide pressure or fluid volume for three torque transmitting mechanisms for a start event. The locking mechanisms 72 and 74 are directly coupled to their respective brakes 32 and 34 and may be of various types. Examples of various types of locking mechanisms are described, but are not limited those, in U.S. Provisional Application No. 61/636,963, filed Apr. 23, 2012, and U.S. Provisional Application No. 61/640,944, filed May 1, 2012, the contents of which are incorporated herein by reference in their entirety. Note that the locking mechanisms can be employed in non-start/stop events. For example, a locking mechanism can be employed to engage a torque transmitting mechanism that is utilized for multiple sequential gears. Such an arrangement reduces the demands on the transmission pump 80.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission in a motor vehicle, the transmission comprising:
    an input member;
    an output member;
    first, second, third and fourth planetary gear sets each having first, second and third members;
    a first interconnecting member continuously interconnecting the first member of the first planetary gear set with the first member of the second planetary gear set;
    a second interconnecting member continuously interconnecting the second member of the first planetary gear set with the second member of the third planetary gear set and the first member of the fourth planetary gear set;
    a third interconnecting member continuously interconnecting the third member of the second planetary gear set with the third member of the third planetary gear set;
    six torque transmitting mechanisms selectively engageable to interconnect one of the first, second, and third members with at least one other of the first members, second members, third members and a stationary member, wherein the torque transmitting mechanisms are selectively engageable in combinations of at least three to establish at least ten forward speed ratios and at least one reverse speed ratio between the input member and the output member;
    a first latching mechanism connected to a fifth of the six torque transmitting mechanisms, wherein the first latching mechanism latches the fifth torque transmitting mechanism in a ready state when the motor vehicle is stopped; and
    a second latching mechanism connected to a sixth of the six torque transmitting mechanisms, wherein the second latching mechanism latches the sixth torque transmitting mechanism in a ready state when the motor vehicle is stopped, and
    wherein the fifth and sixth torque transmitting mechanisms are in the engaged state during a first forward gear or a second forward gear.

2. The transmission of claim 1 wherein the fifth and sixth torque transmitting mechanisms are in the engaged state during a reverse gear.

3. The transmission of claim 1 wherein at least one of the latching mechanisms latches a respective torque transmitting mechanism during the auto start of the motor vehicle after an automatic engine stop event.

4. The transmission of claim 1 wherein the first and second latching mechanisms are hydraulic latching mechanisms.

5. The transmission of claim 1 wherein the first and second latching mechanisms are mechanical latching mechanisms that are mechanically coupled to the fifth and sixth torque transmitting mechanisms.

6. The transmission of claim 1 wherein a first of the six torque transmitting mechanisms is selectively engageable to interconnect the second member of the second planetary gear set with the third member of the fourth planetary gear set.

7. The transmission of claim 6 wherein a second of the six torque transmitting mechanisms is selectively engageable to interconnect the third member of the second planetary gear set with the third member of the fourth planetary gear set.

8. The transmission of claim 7 wherein a third of the six torque transmitting mechanisms is selectively engageable to interconnect the first member of the third planetary gear set to third member of the second planetary gear set.

9. The transmission of claim 8 wherein a fourth of the six torque transmitting mechanisms is selectively engageable to interconnect the first member of the third planetary gear set and the third member of the fourth planetary gear set.

10. The transmission of claim 9 wherein a fifth of the six torque transmitting mechanisms is selectively engageable to interconnect at least one of the third member of the first planetary gear set with a stationary member.

11. The transmission of claim 10 wherein a sixth of the six torque transmitting mechanisms is selectively engageable to interconnect the first member of the first planetary gear set and the first member of the second planetary gear set with the stationary member.

12. The transmission of claim 11 wherein the first members of the first and second planetary gear sets and the third members of the third and fourth planetary gear sets are sun gears, the second members of the first, second, third and fourth planetary gear sets are carrier members and the third members of the first and second planetary gear set and the first members of the third and fourth planetary gear sets are ring gears.

13. The transmission of claim 1 wherein the input member is continuously interconnected with the second member of the second planetary gear set and wherein the output member is continuously interconnected with the second member of the fourth planetary gear set.

14. The transmission of claim 1 wherein two of the torque transmitting mechanisms are brakes and four of the torque transmitting mechanisms are clutches.

15. The transmission of claim 1 wherein the stationary member is a transmission housing.

16. A transmission comprising:
an input member;
an output member;
first, second, third and fourth planetary gear sets each having first, second and third members, wherein the input member is continuously interconnected with the second member of the second planetary gear set and wherein the output member is continuously interconnected with the second member of the fourth planetary gear set;
a first interconnecting member continuously interconnecting the first member of the first planetary gear set with the first member of the second planetary gear set;
a second interconnecting member continuously interconnecting the second member of the first planetary gear set with the second member of the third planetary gear set and the first member of the fourth planetary gear set;
a third interconnecting member continuously interconnecting the third member of the second planetary gear set with the third member of the third planetary gear set;
a first of the six torque transmitting mechanisms is selectively engageable to interconnect the second member of the second planetary gear set with the third member of the fourth planetary gear set;
a second of the six torque transmitting mechanisms is selectively engageable to interconnect the third member of the second planetary gear set with the third member of the fourth planetary gear set;
a third of the six torque transmitting mechanisms is selectively engageable to interconnect the first member of the third planetary gear set to third member of the second planetary gear set;
a fourth of the six torque transmitting mechanisms is selectively engageable to interconnect the first member of the third planetary gear set and the third member of the fourth planetary gear set;
a fifth of the six torque transmitting mechanisms is selectively engageable to interconnect the third member of the first planetary gear set with a stationary member;
a sixth of the six torque transmitting mechanisms is selectively engageable to interconnect the first member of the first planetary gear set and the first member of the second planetary gear set with the stationary member;

a first latching mechanism connected to the fifth torque transmitting mechanism, wherein the first latching mechanism latches the fifth torque transmitting mechanism in an engaged state when the motor vehicle is stopped; and
a second latching mechanism connected to the sixth torque transmitting mechanism, wherein the second latching mechanism latches the sixth torque transmitting mechanism in an engaged state when the motor vehicle is stopped, and
wherein the fifth and sixth torque transmitting mechanisms are in the engaged state during a first forward gear or a second forward gear.

17. The transmission of claim 16 wherein the fifth and sixth torque transmitting mechanisms are in the engaged state during a reverse gear.

18. The transmission of claim 16 wherein the first latching mechanism latches the fifth torque transmitting device during a startup of the motor vehicle after an automatic engine stop event and the second latching mechanism latches the sixth torque transmitting device during the startup of the motor vehicle after the automatic engine stop event.

19. The transmission of claim 16 when the engaged state is filled torque transmitting mechanism, a staged torque transmitting mechanism, a fully engaged torque transmitting mechanism, or any state in between the aforementioned states.

20. A transmission comprising:
an input member;
an output member;
first, second, third and fourth planetary gear sets each having sun gear, carrier member and ring gear, wherein the input member is continuously interconnected with the carrier member of the second planetary gear set and wherein the output member is continuously interconnected with the carrier member of the fourth planetary gear set;
a first interconnecting member continuously interconnecting the sun gear of the first planetary gear set with the sun gear of the second planetary gear set;
a second interconnecting member continuously interconnecting the carrier member of the first planetary gear set with the carrier member of the third planetary gear set and the ring gear of the fourth planetary gear set;
a third interconnecting member continuously interconnecting the ring gear of the second planetary gear set with the sun gear of the third planetary gear set;
a first torque transmitting mechanism selectively engageable to interconnect the carrier member of the second planetary gear set with the sun gear of the fourth planetary gear set;
a second torque transmitting mechanism selectively engageable to interconnect the ring gear of the second planetary gear set with the sun gear of the fourth planetary gear set;
a third torque transmitting mechanism selectively engageable to interconnect the ring gear of the third planetary gear set to the ring gear of the second planetary gear set;
a fourth torque transmitting mechanism selectively engageable to interconnect the ring gear of the third planetary gear set and the sun gear of the fourth planetary gear set;
a fifth torque transmitting mechanism selectively engageable to interconnect the ring gear of the first planetary gear set with a stationary member;
a sixth torque transmitting mechanism selectively engageable to interconnect the sun gear of the first planetary gear set and the sun gear of the second planetary gear set with the stationary member;

a first latching mechanism connected to the fifth torque transmitting mechanism, wherein the first latching mechanism latches the fifth torque transmitting mechanism in an engaged state when the motor vehicle is stopped; and a second latching mechanism connected to the sixth torque transmitting mechanism, wherein the second latching mechanism latches the sixth torque transmitting mechanism in an engaged state when the motor vehicle is stopped, wherein the fifth and sixth torque transmitting mechanisms are in the engaged state during a first forward gear, and wherein the torque transmitting mechanisms are selectively engageable in combinations of at least three to establish at least ten forward speed ratios and at least one reverse speed ratio between the input member and the output member.

* * * * *